U.S. Patent No.: US 7,812,769 B2
Date of Patent: Oct. 12, 2010

(12) United States Patent
Mizuno et al.

(54) RFID READER/WRITER ANTENNA

(75) Inventors: Tomohiro Mizuno, Tokyo (JP);
Hirokazu Sano, Tokyo (JP); Norihisa
Osumi, Tokyo (JP); Rikako Mine,
Tokyo (JP)

(73) Assignee: Mitsubishi Electric Corporation,
Tokyo (JP)

(*) Notice: Subject to any disclaimer, the term of this
patent is extended or adjusted under 35
U.S.C. 154(b) by 0 days.

(21) Appl. No.: 12/596,239

(22) PCT Filed: Jul. 8, 2008

(86) PCT No.: PCT/JP2008/001825

§ 371 (c)(1),
(2), (4) Date: Oct. 16, 2009

(87) PCT Pub. No.: WO2009/008163

PCT Pub. Date: Jan. 15, 2009

(65) Prior Publication Data

US 2010/0117919 A1 May 13, 2010

(30) Foreign Application Priority Data

Jul. 9, 2007 (JP) .............................. 2007-179475

(51) Int. Cl.
H01Q 1/38 (2006.01)
(52) U.S. Cl. ................................ 343/700 MS; 343/846
(58) Field of Classification Search .......... 343/700 MS,
343/846
See application file for complete search history.

(56) References Cited

U.S. PATENT DOCUMENTS 7,408,510 B2 * 8/2008 Yamamoto et al. .... 343/700 MS
7,425,922 B1 * 9/2008 Adams ................ 343/700 MS
2005/0179596 A1 * 8/2005 Higasa et al. ......... 343/700 MS

FOREIGN PATENT DOCUMENTS

| JP | 3 128312 | 12/1991 |
|---|---|---|
| JP | 2682194 | 11/1997 |
| JP | 11 251827 | 9/1999 |
| JP | 2001 52123 | 2/2001 |
| JP | 2001 237638 | 8/2001 |
| JP | 2002 344230 | 11/2002 |
| JP | 2002 353730 | 12/2002 |
| JP | 3094261 | 3/2003 |
| JP | 3417729 | 6/2003 |
| JP | 2003 264424 | 9/2003 |
| JP | 2003 338705 | 11/2003 |
| JP | 2006 113869 | 4/2006 |
| JP | 2006 155511 | 6/2006 |
| JP | 2006 172101 | 6/2006 |
| JP | 2006 180043 | 7/2006 |
| JP | 2006 279202 | 10/2006 |
| WO | 2005 041356 | 5/2005 |

* cited by examiner

Primary Examiner—Hoang V Nguyen
(74) Attorney, Agent, or Firm—Oblon, Spivak, McClelland, Maier & Neustadt, L.L.P.

(57) ABSTRACT

There are provided a plurality of connection auxiliary means 12 electrically connected to an end portion of a central conductor 8 of a coaxial track 5 on a side of a patch conductor 3, and radiately extending toward an edge portion of a penetrating hole 7 on a side of the patch conductor 3. The plurality of connection auxiliary means 12 are fitted to or electrically connected to the edge portion of the penetrating hole 7 with an electrically conductive adhesive.

12 Claims, 7 Drawing Sheets (a)

(b)

(a)

(b)

(c)

(a)

(b)

Radiation Pattern (Circular Polarization)
<Beamwidth: 100.3deg (Ave.), Freq.: 953MHz>

Axial Ratio  <2.4dB (Ave.), Freq.: 953MHz>

Return Loss

Antenna Gain <5.3dBi (Ave.)>

RFID READER/WRITER ANTENNA

This application is a 371 of PCT/JP2008/001825 dated Jul. 8, 2008.

FIELD OF THE INVENTION

The present invention relates to an RFID reader/writer antenna that is an aerial portion of an RFID reader/writer device which, in an RFID (Radio Frequency Identification) system based on an electric wave method (950 MHz band, 2.45 GHz band, or the like), transmits an electric wave which is a command signal to an RFID tag, and receives an electric wave sent back thereto which is a signal which the RFID tag has obtained as a result of reading tag information stored in a memory thereof in response to command information included in the command signal (including a case in which the RFID tag updates the tag information or writes additional information into the tag information).

BACKGROUND OF THE INVENTION

A conventional RFID system is used for biometric access (entrance and exit) management in an access restricted area, such as a habitable room, a factory, or an event site, management of products (physical-distribution management) in a factory or a work site, and so on. In such a conventional RFID system, management is carried out by disposing an RFID reader/writer antenna at a gate of an area to be managed, and mounting or attaching an RFID tag to each target to be managed (for example, refer to patent reference 1). Furthermore, as RFID reader/writer antenna elements, in addition to a patch antenna in which a radiating conductor which is a circular patch conductor is excited with two-point feeding using two microstrip lines, as shown in FIG. 3 of patent reference 1, there have been provided the following ones: a patch antenna in which a two-point feeding method is used, but the radiating element is a rectangular patch conductor and the feed line is a coaxial line (for example, refer to patent reference 2), a patch antenna in which the radiating element is a circular patch conductor, and the feed line is a microstrip line and a single-point feeding method is used (for example, refer to patent reference 3), and a patch antenna in which a single-point feeding method is similarly used, but the radiating element is a circular patch conductor and the feed line is a coaxial line (for example, refer to patent reference 4 and patent reference 5). As shown in patent references 1 and 3 to 5, in communications between the RFID reader/writer antenna and the RFID tag, an electric wave of circular polarization is used in most cases in order to improve the probability of the communications between the RFID reader/writer antenna and the RFID tag, because the angle of the antenna element of the RFID tag is not kept constant due to variations in the position at which the RFID tag is attached to an object.

In another conventional RFID system, a history of each product in manufacturing process stages is managed on a transportation line in an FA (Factory Automation) factory or the like (for example, manufacturing process stages of assembling products which are being carried on a conveyance system, such as a conveyor belt, and are flowing through the process stages one by one are managed), that is, the tag information in the RFID tag attached to each product moving is updated or additional information is written into the RFID tag, or the tag information is acquired from the RFID tag (for example, refer to patent references 1, 6 and 7).

[Patent reference 1] JP, 2006-113869,A (paragraphs 0017 to 0026 and FIGS. 1 to 4)

[Patent reference 2] JP, 2006-279202,A (paragraphs 0010 to 0012, and FIGS. 1 and 2)

[Patent reference 3] JP, 2006-180043,A (paragraph 0024 and FIG. 4)

[Patent reference 4] JP, 2001-237638,A (paragraphs 0038 and FIGS. 4(a) and 4(b))

[Patent reference 5] JP, 2001-52123,A (paragraphs 0011 and 0012, and FIGS. 1 and 2)

[Patent reference 6] JP, 2006-155511,A (paragraph 0071 and FIG. 2)

[Patent reference 7] JP, 2006-172101, A (paragraphs 0016 to 0020 and FIGS. 1 to 5)

In recent years, there has been a growing tendency to require product traceability (traceability) using an RFID system. In order to implement this product traceability, there is a necessity to certainly perform management of a history of each product in manufacturing process stages in each of all the manufacturing process lines or a certain number of manufacturing process lines close to the total number. Therefore, an RFID reader/writer antenna is disposed even in a process stage having a short processing line interval, though degradation of the capability of the RFID reader/writer antenna has to be avoided as much as possible and its size has to be reduced (the size of an RFID reader/writer antenna refers to the area of the electric wave radiation surface thereof unless otherwise specified) so that RFID reader/writer antennas are arranged densely and there is provided space for arrangement of processing machines and workers who perform machining. However, information reading (management) systems as shown in patent references 1 and 6 do not take into consideration the intervals among process stages and the type and size of RFID reader/writer antennas. Therefore, in a case in which, for example, an antenna having a loop shape as shown in patent reference 7 is adopted as an RFID reader/writer antenna element as shown in patent references 1 and 6, there arises a problem that in a manufacturing process stage having a short processing line interval, it is difficult to provide space for arrangement of processing machines and workers who perform machining so as to carry out management of the manufacturing processing.

On the other hand, an RFID reader/writer antenna element as described in patent references 1 to 5 is a patch antenna in which a radiating conductor (a circular or rectangular patch conductor) is arranged on a front surface of a dielectric substrate, and a ground conductor is arranged on a rear face of the dielectric substrate. In a case in which the dielectric substrate is formed to have a high dielectric constant in order to make the size of this RFID reader/writer antenna small, the size of the resonator of the patch antenna can be reduced. That is, since the area of the radiating conductor can be reduced, the size of the RFID reader/writer antenna can be reduced. In addition, the use of a coaxial feeding method of electrically connecting the outer conductor of a coaxial line to the ground conductor of a patch antenna, and electrically connecting a central conductor to a radiating conductor can achieve further downsizing of the size as compared with the use of a microstrip feeding method. There are also many patch antennas using, as their dielectric substrates, an air layer without using any dielectric material, each of the patch antennas serving as an RFID reader/writer antenna element (patch antennas equivalent to that in which a dielectric layer having a dielectric constant of 1 is sandwiched between a radiating conductor and a ground conductor).

Because a patch antenna is a resonance-type element antenna, increase in the dielectric constant of the dielectric substrate of the patch antenna simply results in increase in the Q value as a resonator and hence decrease in the radiation efficiency (the ratio of the radiation power from the antenna to the electric power supplied to the antenna). Therefore, what is necessary in order to construct a small-size good-radiation-efficiency patch antenna is just to thicken its dielectric substrate.

However, an increase in the thickness of the dielectric substrate causes an increase in the amount of variation in the thickness resulting from thermal expansion of the dielectric substrate due to variations in environmental temperature, and a stress exerted on a connecting portion at which the radiating conductor is connected to the central conductor of the coaxial feeding portion also increases. A problem is therefore that reduction of the reliability occurs in the connecting portion, for example, a crack occurs in the connecting portion when the connecting portion is soldered, and hence there is a possibility that the performance of the RFID reader/writer antenna degrades or the RFID reader/writer antenna goes out of order.

The present invention is made in order to solve the above-mentioned problem, and it is therefore an object of the present invention to provide a new RFID reader/writer antenna that includes, as an antenna element thereof, a patch antenna, that adopts, as a substrate thereof, a high dielectric constant material, that suppresses degradation of its reliability resulting from an increase in the thickness of the dielectric substrate, that implements a downsizing thereof to enable dense arrangement of plural sets thereof even in a process stage having a narrow processing line interval, and that improves a possibility of suppressing reduction in space for arrangement of processing machines using sets thereof and workers who perform machining using sets thereof.

DISCLOSURE OF THE INVENTION

In accordance with the invention of claim 1, there is provided an RFID reader/writer antenna for communicating with an RFID tag, including a dielectric substrate having a circular or rectangular patch conductor disposed on a front surface thereof and a ground conductor disposed on a rear face thereof, a penetrating hole penetrating the dielectric substrate, and a coaxial track having a central conductor inserted into the penetrating hole, and electrically connected to a feeding point on the above-mentioned patch conductor and electrically insulated from the above-mentioned ground conductor, and an outer conductor covering an outer surface portion of the above-mentioned central conductor extending up to the rear face of the above-mentioned dielectric substrate, and electrically connected to the above-mentioned ground conductor, characterized in that the RFID reader/writer antenna includes: a plurality of connection auxiliary means electrically connected to an end portion of the above-mentioned central conductor on a side of the above-mentioned patch conductor and radiately extending toward an edge portion of the above-mentioned penetrating hole on a side of the above-mentioned patch conductor; and a connecting means for electrically connecting the plurality of connection auxiliary means and the above-mentioned edge portion.

As a result, the plurality of connection auxiliary means serve as a buffer of a stress caused by a variation in the thickness of the dielectric substrate resulting from thermal expansion of the dielectric substrate, and exerted on the connecting means which is an electric connecting point at which the central conductor of the coaxial track and the feeding portion of the patch conductor are electrically connected to each other. Therefore, in the RFID reader/writer antenna, the reliability of the electric connection between the central conductor of the coaxial track and the feeding portion of the patch conductor is improved, and the degradation of the antenna performance resulting from increase in the thickness of the dielectric substrate is suppressed.

In accordance with the invention of claim 2, in the RFID reader/writer antenna according to claim 1, the above-mentioned connection auxiliary means is a gear-shaped conductor.

As a result, in addition to the advantage of facilitating the electric connection with the end portion of the central conductor on the side of the patch conductor, the stress caused by a variation in the thickness of the dielectric substrate resulting from thermal expansion of the dielectric substrate is equally exerted on the teeth of the gear-shaped conductor, and the function of serving as a buffer becomes more reliable. Therefore, in the RFID reader/writer antenna, the thickness of the dielectric substrate in which the reliability of the electric connection between the central conductor of the coaxial track and the feeding portion of the patch conductor is improved is increased, and the degradation of the antenna performance resulting from increase in the thickness of the dielectric substrate is suppressed.

In accordance with the invention of claim 3, in the RFID reader/writer antenna according to claim 1, the above-mentioned connection auxiliary means is a thin film conductor.

As a result, in the RFID reader/writer antenna, the margin against deformations of the plurality of connection auxiliary means which is caused by the stress caused by a variation in the thickness of the dielectric substrate resulting from thermal expansion of the dielectric substrate is increased.

In accordance with the invention of claim 4, in the RFID reader/writer antenna according to claim 1, the above-mentioned central conductor has a step portion or a tapered portion at the end portion thereof on the side of the above-mentioned patch conductor, and the above-mentioned connection auxiliary means is fitted to the step portion or tapered portion or is adhered to the step portion or tapered portion with an electrically conductive adhesive, so that the connection auxiliary means is electrically connected to the step portion or tapered portion.

As a result, because the electric connection between the patch conductor and the plurality of connection auxiliary means is facilitated, the RFID reader/writer antenna is made to be excellent for mass production.

In accordance with the invention of claim 5, in the RFID reader/writer antenna according to claim 1, at least a part of a portion of the above-mentioned central conductor inserted into the above-mentioned penetrating hole has a diameter larger than that a portion of the above-mentioned central conductor which is covered by the above-mentioned outer conductor.

As a result, although there is a problem that when the thickness of the dielectric substrate is increased, the parasitism reactance component of the central conductor which increases with the increase in the thickness of the dielectric substrate has a bad influence upon the performance of the RFID reader/writer antenna because the central conductor in the penetrating hole of the dielectric substrate has to have a length according to the increase in the thickness, by making the diameter of the portion of the central conductor of the coaxial track inserted into the penetrating hole larger than that of the portion of the central conductor which is covered by the outer conductor of the coaxial track, the parasitism reactance component appearing in the central conductor in the penetrating hole is suppressed and the coaxial track has a good electric wave reflection property, so that the RFID reader/writer antenna can supply the electric power to the patch conductor efficiently.

PREFERRED EMBODIMENTS OF THE INVENTION

Hereafter, in order to explain this invention in greater detail, the preferred embodiment of the present invention will be described with reference to the accompanying drawings.

Embodiment

Figure 1:
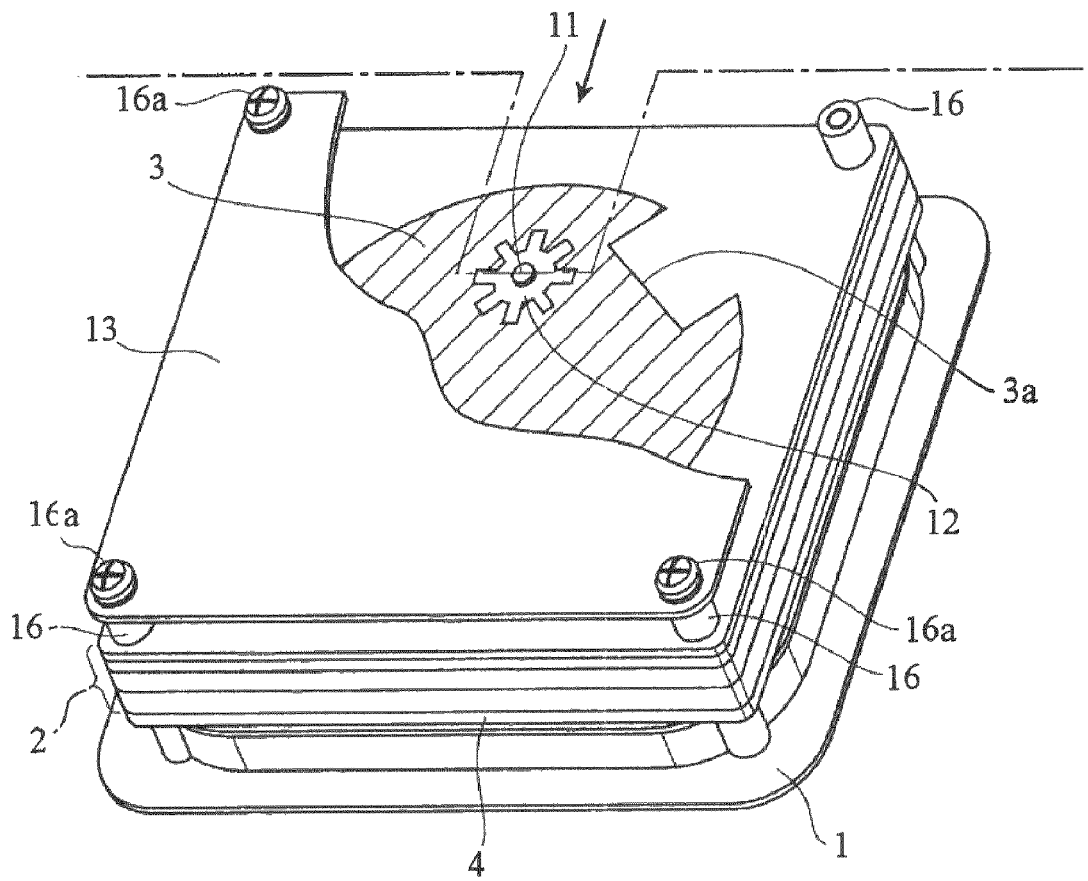
FIG. 1 is a configuration diagram of an RFID reader/writer antenna in accordance with Embodiment of the present invention.
Figure 1:
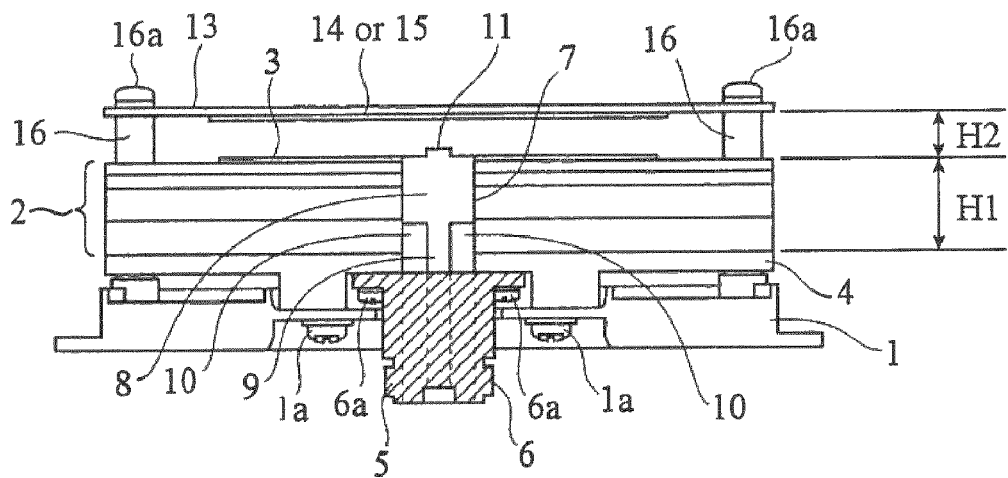
Figure 2:
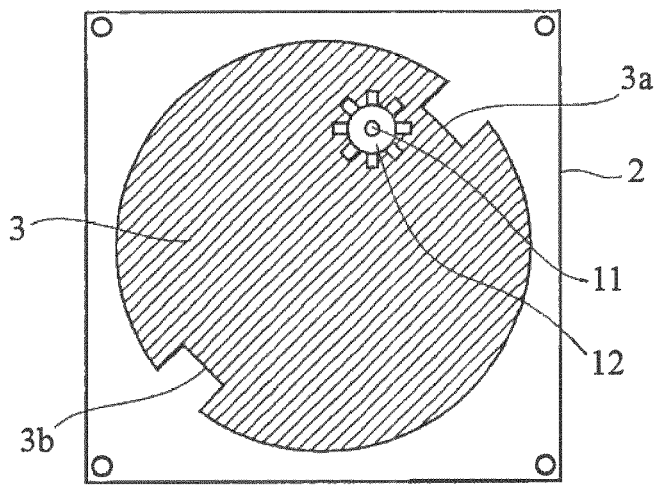
FIG. 2 is a surface view of a dielectric substrate of the RFID reader/writer antenna in accordance with Embodiment of the present invention.
Figure 2:
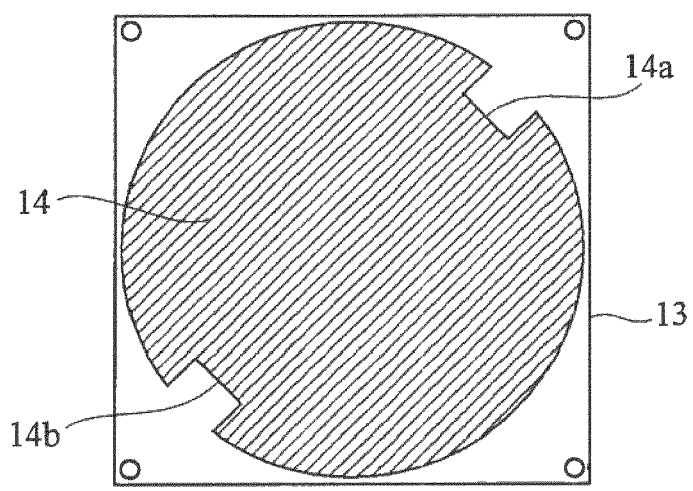
Figure 2:
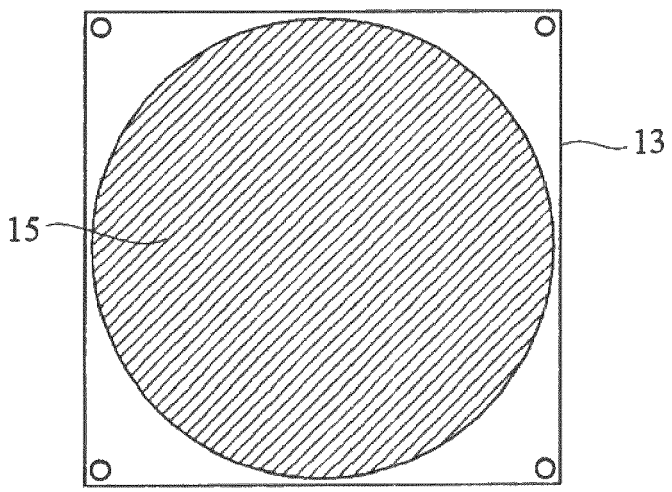
Figure 3:
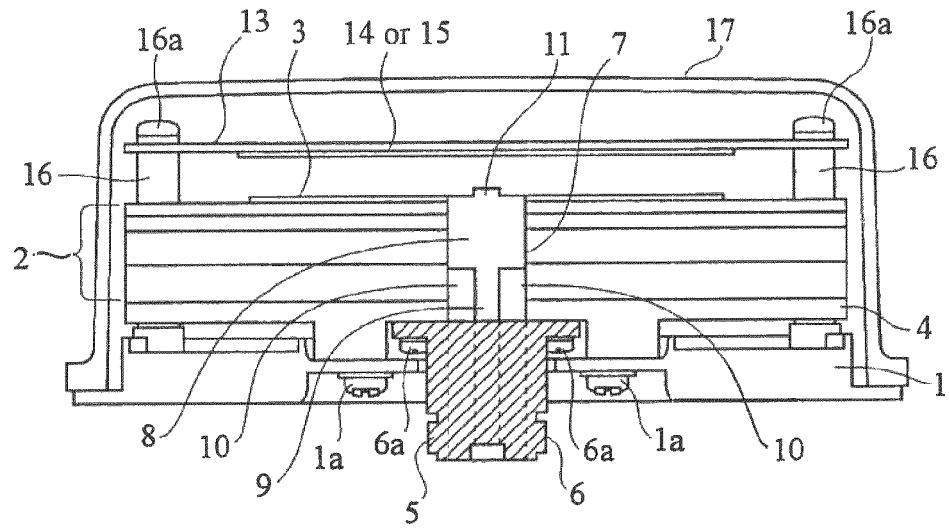
FIG. 3 is a configuration diagram of the RFID reader/writer antenna (with a radome) in accordance with Embodiment of the present invention.

Hereafter, Embodiment of the present invention will be explained with reference to FIGS. 1 to 3. FIG. 1 is a block diagram of the RFID reader/writer antenna in accordance with Embodiment, FIG. 1(a) is a bird's-eye view of the RFID reader/writer antenna (a part of an upper dielectric substrate is shown in perspective), FIG. 1(b) is a cross-sectional view of a portion of the RFID reader/writer antenna, taken along a dotted line, when viewed from a direction of an arrow shown in an upper portion of FIG. 1(a), FIG. 2 is a surface view of a dielectric substrate of the RFID reader/writer antenna in accordance with Embodiment, FIG. 2(a) is a figure of a patch conductor of the RFID reader/writer antenna, FIG. 2(b) is a figure of a patch conductor of a non-feeding element (with a degeneration separation element) of the RFID reader/writer antenna, FIG. 2(c) is a figure of a patch conductor of a non-feeding element (without any degeneration separation element) of the RFID reader/writer antenna, and FIG. 3 is a configuration diagram of the RFID reader/writer antenna (with a radome) in accordance with Embodiment. In FIGS. 1 to 3, reference numeral 1 denotes a casing of the RFID reader/writer antenna, reference numeral 2 denotes a dielectric substrate having a thickness H1 and installed in the casing 1 (in this Embodiment, the RFID reader/writer antenna will be explained by taking, as an example, a multilayer substrate comprised of four dielectric substance layers), reference numeral 3 denotes a circular patch conductor formed on a front surface of the dielectric substrate 2, reference numerals 3a and 3b each denotes a notch-shaped degeneration separation element formed in the patch conductor 3, reference numeral 4 denotes a ground conductor placed on a rear face of the dielectric substrate 2, reference numeral 1a denotes a casing fixing screw for connecting the casing 1 and the ground conductor 4 (In this Embodiment, four casing fixing screws 1a are used at four places respectively. However, only two casing fixing screws 1a are shown in FIGS. 1(b) and 3, because these figures are cross-sectional ones), reference numeral 5 denotes a coaxial track for supplying electric power to a feeding portion of the patch conductor 3, reference numeral 6 denotes a coaxial connector that places the coaxial track 5 at the rear face of the dielectric substrate, and that also serves as an outer conductor of the coaxial track 5, reference numeral 6a denotes a coaxial fixing screw for fixing the coaxial connector 6 to the rear face of the dielectric substrate 2, and for electrically connecting the coaxial connector 6 and the ground conductor 4 (generally, four corners of a flange portion of the coaxial connector are fixed as shown in FIG. 1), reference numeral 7 denotes a penetrating hole that is formed between the feeding portion of the patch conductor 3 and the ground conductor 4, and that is penetrating the dielectric substrate 2, reference numeral 8 denotes a central conductor of the coaxial track 5 that is inserted into the penetrating hole 7 (the inside of the penetrating hole), reference numeral 9 denotes a central conductor disposed inside the coaxial connector 6 and electrically connected to the central conductor 8 (the inside of the coaxial connector), and reference numeral 10 denotes a dielectric layer that covers the perimeter of the central conductor 9 and that electrically insulates the outer conductor of the coaxial connector 6 and the ground conductor 4 from the central conductor 9, as shown by dotted lines of the coaxial connector 6 shown in FIGS. 1(b) and 3. The patch antenna is formed in the dielectric substrate 2 in this way.

Reference numeral 11 denotes a step-shaped projecting portion disposed at an end portion of the central conductor 8 on the side of the patch conductor 3 (on a top portion of the central conductor 8), and having a diameter which is reduced from that of the central conductor 8, reference numeral 12 denotes a gear-shaped conductor that has a hole into which the projecting portion 11 can be fitted, and that is formed of a conductive thin film, such as a copper foil, the gear-shaped conductor serving as connection auxiliary means for electrically connecting the central conductors 8 and 9 to an edge portion of the penetrating hole 7, which is a feeding portion, on a side of the patch conductor 3, reference numeral 13 denotes the upper dielectric substrate disposed at a distance H2 from the front surface of the dielectric substrate 2, reference numeral 14 denotes a circular upper patch conductor that is formed on a front surface or a rear face of the upper dielectric substrate 13 and that is the non-feeding element of the RFID reader/writer antenna, reference numerals 14a and 14b each denotes a notch-shaped degeneration separation element in disposed in the upper patch conductor 14, and reference numeral 15 denotes a circular upper patch conductor that is formed on the front surface or the rear face of the upper dielectric substrate 13 and that is the non-feeding element (without any degeneration separation element) of the RFID reader/writer antenna. In this Embodiment, an explanation will be made as to an example in which the upper patch conductor 14 or 15 is formed on the rear surface of the upper dielectric substrate 13. Reference numeral 16 denotes a cylindrical supporting member that is installed at one of the four corners of the dielectric substrate 2 and the upper dielectric substrate 13, and that serves as a spacer for keeping the distance H2 between the substrates 2 and 14 so as to support the upper dielectric substrate 13, reference numeral 16a denotes a substrate fixing screw which is inserted into one of the four cylindrical supporting members 16 so as to fix the dielectric substrate 2 and the upper dielectric substrate 13 to the casing 1, and reference numeral 17 denotes the radome that covers the dielectric substrate 2 and the upper dielectric substrate 13, and that is fixed to the casing 1. In the figures, the same reference numerals denote the same components or like components, and therefore the detailed explanation about them will be omitted hereafter. Hereinafter, a RFID reader/writer, the RFID reader/writer antenna, and a RFID tag may be abbreviated as a reader/writer, the reader/writer antenna, and a tag respectively. In some of FIGS. 1 to 3, an electrically conductive adhesive for electrically connecting the gear-shaped conductor 12 to the feed portion of the patch conductor portion 3 and the projecting portion 11 and the gear-shaped conductor 12 (FIGS. 1(a) and 3) are not shown. This is because the shape of the gear-shaped conductor 12 and the whole configuration of the reader/writer antenna are shown clearly in the figures. An explanation of the structure of the electrically conductive adhesive and the gear-shaped conductor 12 will be made after an explanation of the whole configuration of the reader/writer antenna.

A part of the upper dielectric substrate 13 of the reader/writer antenna shown in FIG. 1(a) is illustrated in perspective (refer to FIGS. 2(a) and 2(b) for the details of the upper patch conductor formed on the rear face of the upper dielectric substrate 13). Hereafter, the operation of the reader/writer antenna will be explained. The input/output terminal of a reader/writer device and the coaxial connector 6 of the reader/writer antenna are connected to each other via a coaxial cable, and communication signal electric power for RF transmission signal is supplied from the reader/writer device to the feeding portion on the patch conductor 3 (the edge portion of the penetrating hole 7) via the central conductors 8 and 9, so that the patch conductor 3 and the upper patch conductor 14 are excited and an electric wave of circular polarization is transmitted as a transmission wave (an RF transmission signal). A tag existing in an area in which it can receive the transmission wave receives the transmission wave, and sends a reply wave according to a command signal included in the transmission wave back to the reader/writer antenna. Next, the reply wave is received by the reader/writer antenna, and the received reply wave is then sent to the reader writer device via the coaxial cable. In this way, an RFID system is constructed. An application of the RFID system to a history management system for managing a history of each product in manufacturing process stages will be mentioned later.

In this case, the upper patch conductor 14 formed on the rear surface of the upper dielectric substrate 13 at the distance H2 from the dielectric substrate 2 operates as the non-feeding element of the reader/writer antenna and is excited by an electric wave radiated from the patch conductor 3 of the dielectric substrate 2, so that an electric wave of circular polarization is transmitted by the radiation wave from each of the patch conductor 3 and the upper patch conductor 14. The patch antenna in which the patch which is the non-feeding element is placed above the feeding patch (the patch conductor 3) has an advantage of broadening the band of reflection matching and providing an improvement in the radiation efficiency. In this case, in the patch antenna having the non-feeding element, the diameters of the feeding patch (the patch conductor 3) and the non-feeding patch (the upper patch conductor 14), the thickness H1 of the dielectric substrate 2 and the distance H2 are determined in such a way that each of the feeding patch and the non-feeding patch operates as an independent resonator, and reflection matching is established in a desired frequency range. Because the details of the principle behind a combination of waves of circular polarization and those of degeneration separation elements are the same as those described in patent references quoted in the Disclosure of the Invention and known techniques, the explanation of them will be omitted hereafter.

From the cross-sectional view shown in FIG. 1(b), a connection relation between the feeding portion of the above-mentioned patch conductor 3 and the coaxial track 5 is clear, and a positional relationship between the dielectric substrate 2 and the upper dielectric substrate 13 is also clear. Furthermore, according to requirements on the performance of the reader/writer antenna, instead of the patch antenna (with the non-feeding element) having the degeneration separation elements 14a and 14b in the upper patch conductor 14 as shown in FIG. 2(b), the patch antenna (with the non-feeding element) having the upper patch conductor 15 which is not provided with the degeneration separation element as shown in FIG. 2(c) can be adopted. In addition, there can be a case in which, depending on the requirements on the performance of the reader/writer antenna, the non-feeding element (the upper dielectric substrate 13) itself is not needed. In such a case, because the reader/writer antenna can be designed to have a structure in which no non-feeding element is disposed, as compared with that as shown in FIG. 1(b), the reader/writer antenna can be formed to have an antenna structure in which the upper dielectric substrate 13 and the supporting members 16 are eliminated, so that the reader/writer antenna can have a thinner thickness in a direction of the thickness of the substrate and the thickness of the radome 17 shown in FIG. 3 can also be reduced. Therefore, in addition to a downsizing of the reader/writer antenna, a weight reduction of the reader/writer antenna can be achieved.

Figure 4:
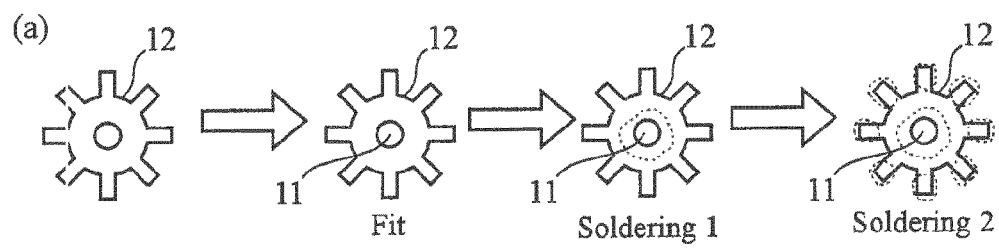
FIG. 4 is a configuration diagram of connection auxiliary means in a feeding portion of the RFID reader/writer antenna in accordance with Embodiment of the present invention.
Figure 4:
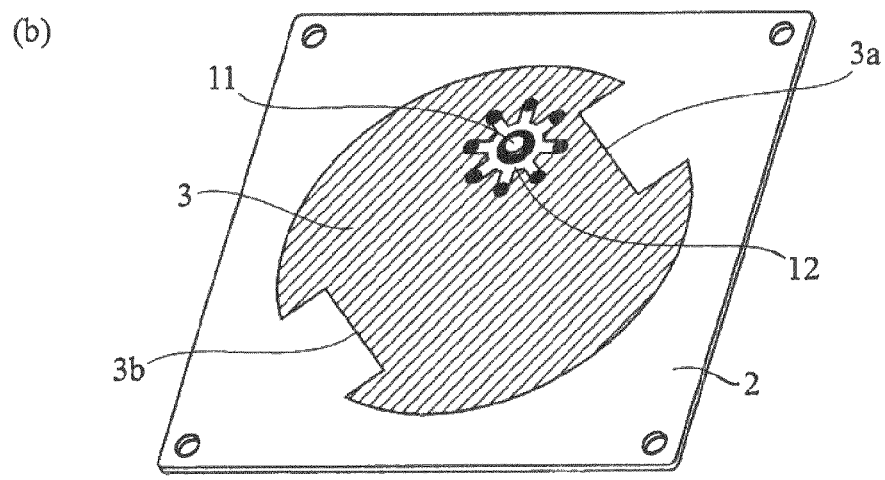

FIG. 4 is a configuration diagram of the connection auxiliary means in the feeding portion of the RFID reader/writer antenna in accordance with Embodiment, FIG. 4(a) is a figure showing a process of electrically connecting the gear-shaped conductor, and FIG. 4(b) is a view showing the outward appearance of the dielectric substrate after the gear-shaped conductor is electrically connected to the feeding portion. In the figures, the same reference numerals denote the same components or like components, and therefore the detailed explanation about them will be omitted hereafter. Hereafter, a structure in where the influence upon the connection between the feeding portion and the coaxial track can be reduced even if there is an increase in the variations in the thickness of the dielectric substrate due to thermal expansion of the dielectric substrate caused by an increase in the thickness of the dielectric substrate will be explained. In the process shown in FIG. 4(a), the electric connection between the gear-shaped conductor 12 and the projecting portion 11 can be established by using a fit and an electrically conductive adhesive, such as solder. Although it is acceptable that the electric connection is established by using only a fit, it is preferable to use an electrically conductive adhesive from the viewpoint of the reliability of the electric connection. In this Embodiment, solder is used as the electrically conductive adhesive. First, the central conductor 8 is inserted into the penetrating hole 7, the hole of the gear-shaped conductor 12 is fitted to the projecting portion 11 formed on the top portion of the central conductor 8, and an area including and around a fitting portion at which the hole of the gear-shaped conductor is fitted to the projecting portion is soldered (soldering 1).

In this case, when the soldering is done in such a way that the solder travels up to a contact portion at which the top portion of the central conductor 8 is in contact with the gear-shaped conductor 12, the reliability of the electric connection is improved. Next, the patch conductor 3 is soldered with the plurality of gear teeth radiately extending from the hole of the gear-shaped conductor 12 (soldering 2). The order in which the solderings 1 and 2 are performed can be reversed, or they can be performed simultaneously. Furthermore, as long as the hole of the gear-shaped conductor 12 can be fitted to or soldered with the projecting portion 11, instead of the projecting portion 11, a tapered portion which is formed by tapering the top portion of the central conductor 8 can be used. Holes formed in the four corners of each of the dielectric substrate 2 and the upper dielectric substrate 13 shown in FIGS. 2 and 4 are used to make the substrate fixing screws 16a pass therethrough.

By thus electrically connecting the central conductor 8 of the coaxial track 5 and the patch conductor 3 by using the gear-shaped conductor 12 (the plurality of gear teeth of the gear-shaped conductor 12), the stress applied to the soldering portion, at which the central conductor of the coaxial track and the feeding portion of the patch conductor 3 are soldered with each other, due to thermal expansion of the dielectric substrate 2 is absorbed by the gear-shaped conductor 12 (the plurality of gear teeth of the gear-shaped conductor 12), a solder crack can be prevented from occurring at the soldering portion. The plurality of connection auxiliary means are not limited to the gear-shaped conductor 12 (the plurality of gear teeth of the gear-shaped conductor 12) explained in this Embodiment. As long as the plurality of connection auxiliary means are a conductor having portions radiately extending toward the edge portion of the penetrating hole 7 on the side of the patch conductor 3, they can be alternatively shaped like a cross, a star, or a polygon. In addition, instead of either the projecting portion 11 nor the tapered potion formed in the top portion of the central conductor 8, a plurality of thin conducting members, such as a plurality of golden ribbons, can be formed in such a way as to extend radiately from the top portion of the central conductor 8 toward the edge portion of the penetrating hole 7 and can be electrically connected with the top portion of the central conductor and the edge portion of the penetrating hole. That is, what is necessary is just to select the plurality of connection auxiliary means in such away that there occurs a state equivalent to the state in which the top portion of the central conductor 8 is electrically and continuously connected to the feeding portion (the edge portion of the penetrating hole 7).

In the reader/writer antenna shown in FIGS. 1 to 4, in order to suppress the parasitism reactance component of the central conductor 8 in the penetrating hole 7 which increases with an increase in the thickness of the dielectric substrate 3 to provide a good reflection property and to supply electric power to the patch conductor efficiently, the central conductor 8 inserted into the penetrating hole 7 of the coaxial track 5 is formed to have a larger diameter than that of the central conductor 9 covered by the outer conductor of the coaxial track, as shown in the figures, though what is necessary is just to determine the relation between the diameter of the central conductor 8 and that of the central conductor 9 according to requirements on the reflection property, and the central conductor 8 and the central conductor 9 can have the same diameter or can be integrally formed (the same as those of a conventional coaxial track) as the case may be.

Next, the fact that a problem which arises in a case in which the central conductor 8 has a large diameter or the central conductor 8 and the central conductor 9 are formed integrally and have a large diameter can be solved by the invention of this Embodiment will be explained. In the case in which the central conductor 8 has a large diameter, or the central conductor 8 and the central conductor 9 are formed integrally and the central conductor has a large diameter, when the edge portion of the penetrating hole 7 on the side of the front surface of the dielectric substrate 2 which is the feeding portion is soldered with the central conductor, the solder cannot be warmed up easily during the soldering because the core wire which is the central conductor is thick, the length of time for heat to transfer from the soldering iron to the solder, the edge portion of the penetrating hole 7, and then the core wire becomes long. Therefore, because the working efficiency of the soldering gets worse and the heat for the soldering is applied to the dielectric substrate 3 for a long time, there is a possibility that the dielectric substrate 3 becomes deteriorated and the electrical property of the dielectric substrate 3 degrades. In contrast, for the electric connection between the edge portion of the penetrating hole 7 and the central conductor, the invention of this Embodiment uses the plurality of connection auxiliary means which are the gear-shaped conductor 12 formed of a copper foil, a conductor shaped like a cross, a star, or a polygon, or a plurality of thin conducting members radiately extending from the top portion of the central conductor 8 toward the edge portion of the penetrating hole 7. Therefore, as shown in FIG. 4, because the solder is not applied over the whole of an area around the top portion of the central conductor 8, but is partially applied to the connection auxiliary means, the application of the heat can be restricted to the local area, the workability can be improved, and therefore the deterioration of the substrate can be reduced to a minimum.

Figure 5:
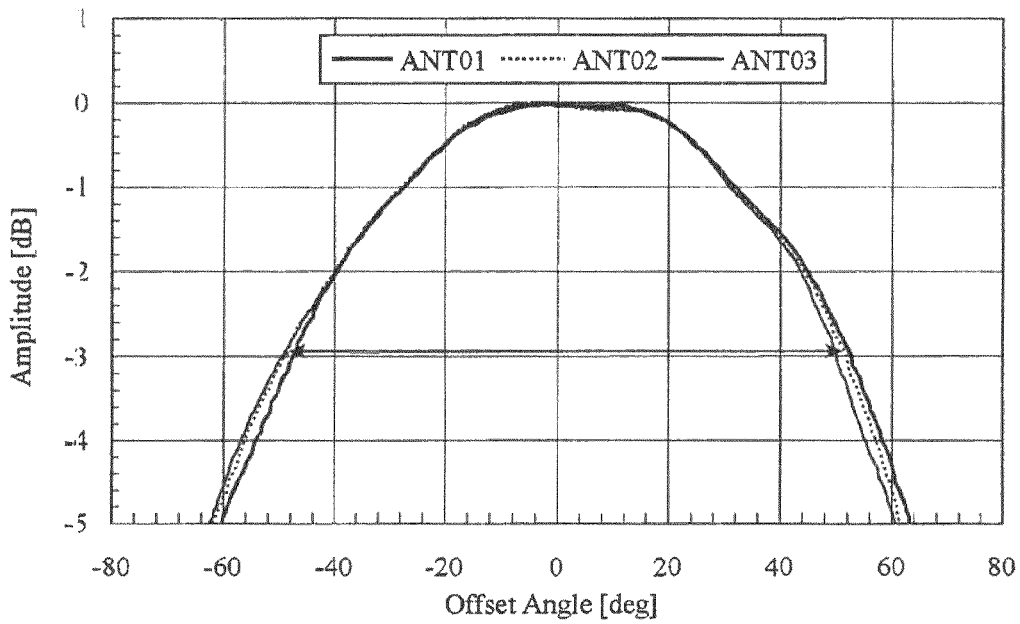
FIG. 5 is a figure showing measured values of a radiation pattern of an RFID reader/writer in accordance with Embodiment of the present invention.
Figure 6:
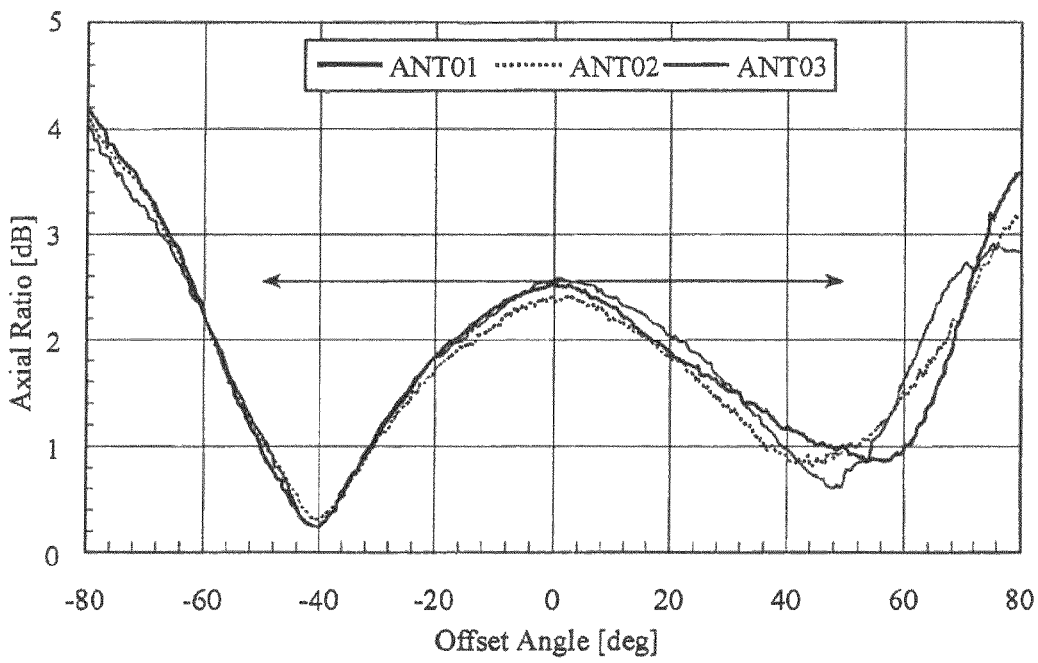
FIG. 6 is a figure showing measured values of an axial ratio of the RFID reader/writer in accordance with Embodiment of the present invention.
Figure 7:
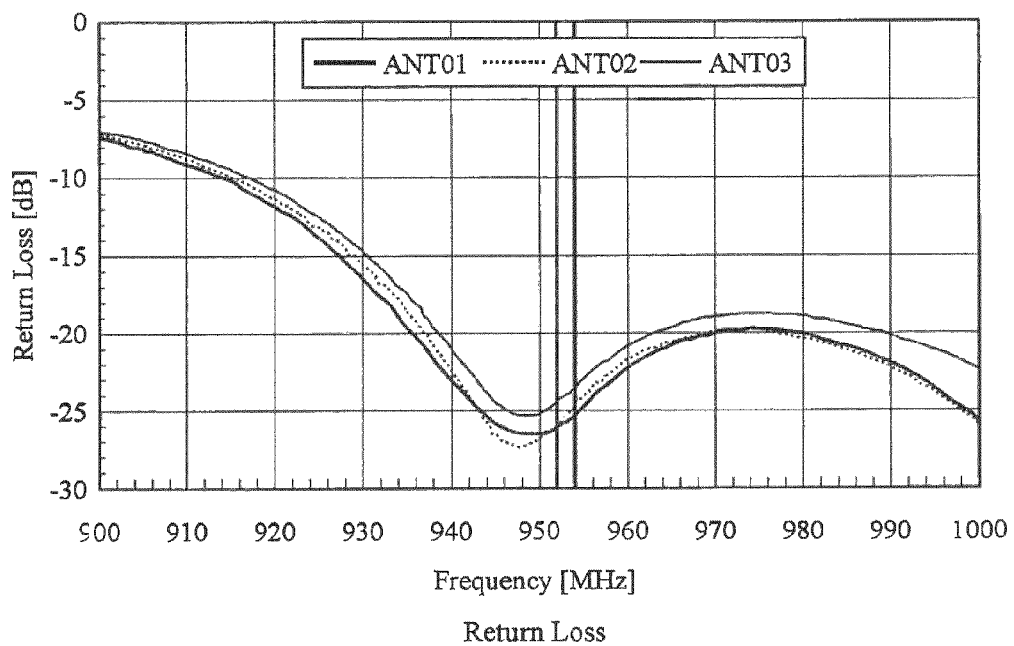
FIG. 7 is a figure showing measured values of a return loss of the RFID reader/writer in accordance with Embodiment of the present invention.
Figure 8:
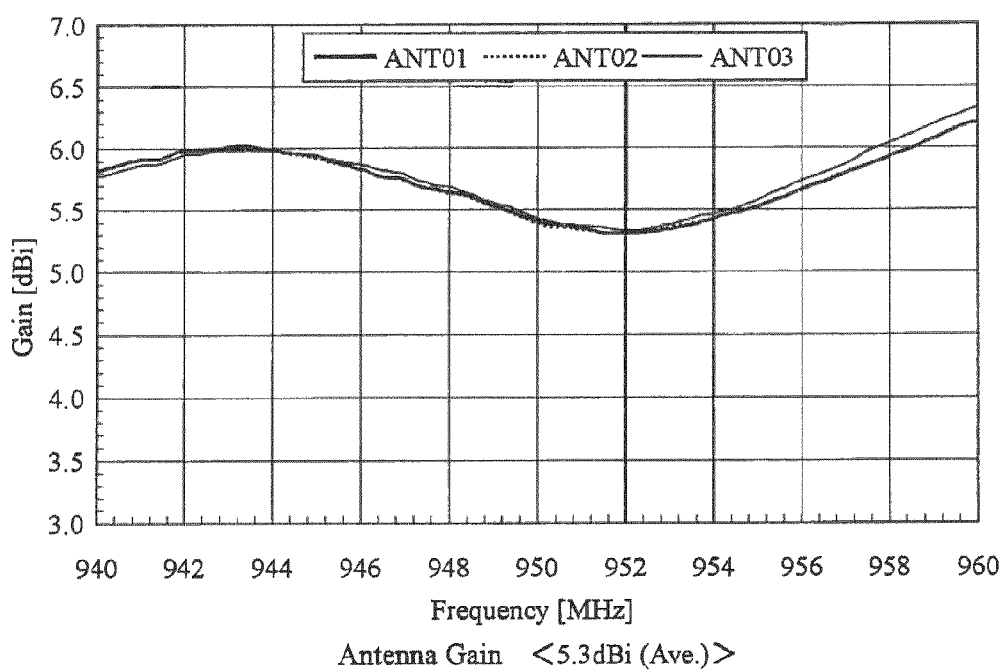
FIG. 8 is a figure showing measured values of an antenna gain of the RFID reader/writer in accordance with Embodiment of the present invention.

The invention of this Embodiment was applied to a reader/writer antenna in an RFID system which is used in a band of 950 MHz, and three reader/writer antennas having a size of about 110 mm square (a thickness of about 40 mm) were manufactured on the same conditions, and their performances were measured. FIG. 5 is a figure showing measured values of a radiation pattern of the RFID reader/writer in accordance with Embodiment, FIG. 6 is a figure showing measured values of an axial ratio of the RFID reader/writer in accordance with Embodiment, FIG. 7 is a figure showing measured values of a return loss of the RFID reader/writer in accordance with Embodiment, and FIG. 8 is a figure showing measured values of an antenna gain of the RFID reader/writer in accordance with Embodiment of the present invention. In the figures, ANT01 to ANT03 are the identification numbers of the three experimental reader/writer antennas. Because the three experimental reader/writer antennas all have a −3 dB beamwidth of about 100 degrees, as shown by an arrow in FIG. 5, and have an axial ratio equal to or smaller than 2.4 dB within the limits of a beamwidth shown by an arrow in FIG. 6 at 953 MHz, it can be seen from these figures that the reader/writer antennas have a good axial ratio of the radiation wave over a wide angle region. Next, because it can be seen from FIG. 7 that the three experimental reader/writer antennas all have a return loss of about −25 dB in a region from 952 to 954 MHz (between vertical lines shown in each of FIGS. 7 and 8), and it can be seen from FIG. 8 that they all have an antenna gain of more than 5.3 dBi, it can be apparent from the measured values shown in FIGS. 5 to 8 that while their performances are maintained compared with a conventional reader/writer using, as a dielectric substrate, an air layer without using any dielectric material, and having a size of about 210 mm square (a thickness of about 20 mm), the length of one side of the antenna face of the reader/writer antenna in accordance with this Embodiment can be reduced to about half of that of the conventional reader/writer and the area of the antenna face can be reduced to about one-quarter to one-third of that of the conventional reader/writer.

Figure 9:
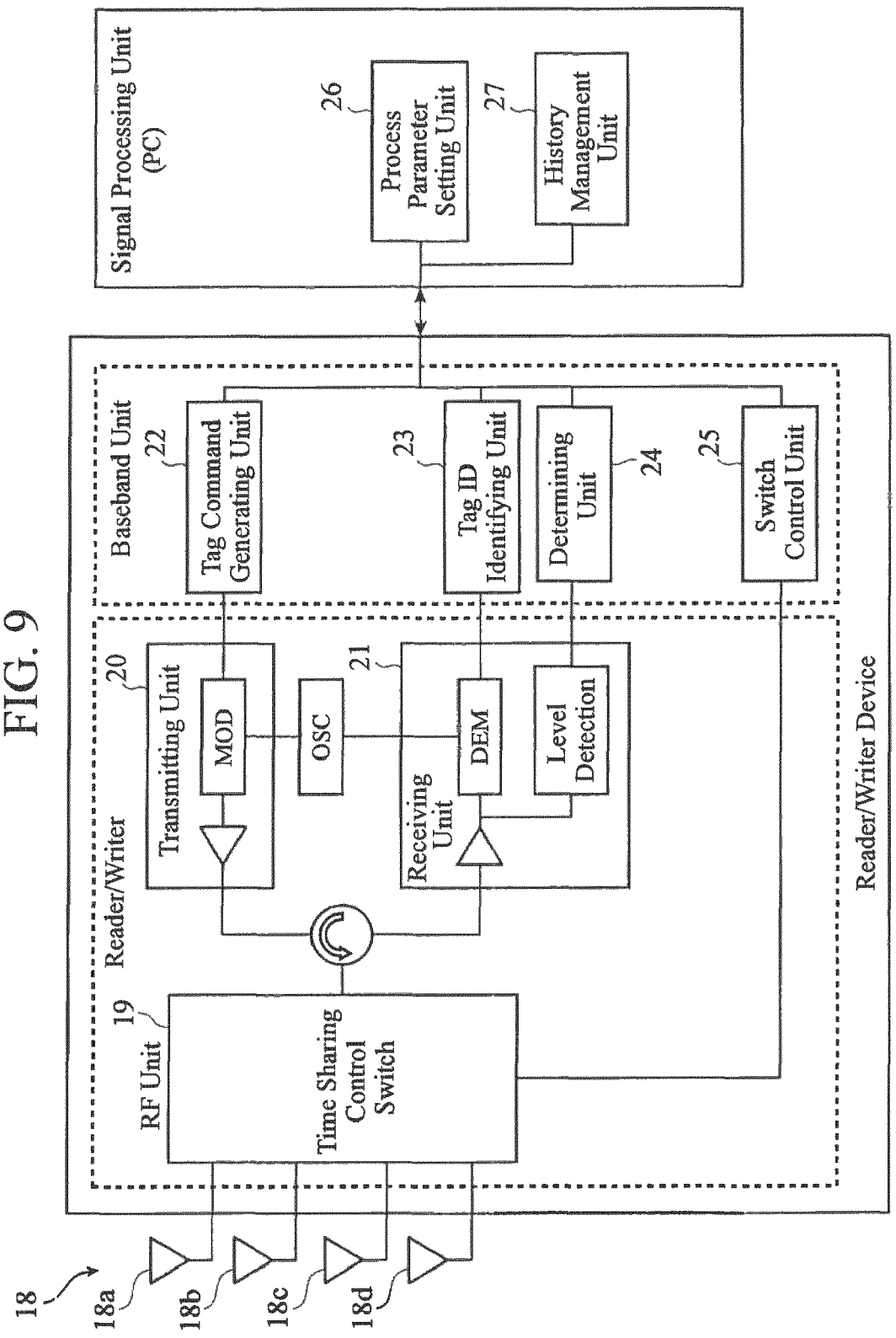
FIG. 9 is a configuration diagram of an RFID reader writer device.
Figure 10:
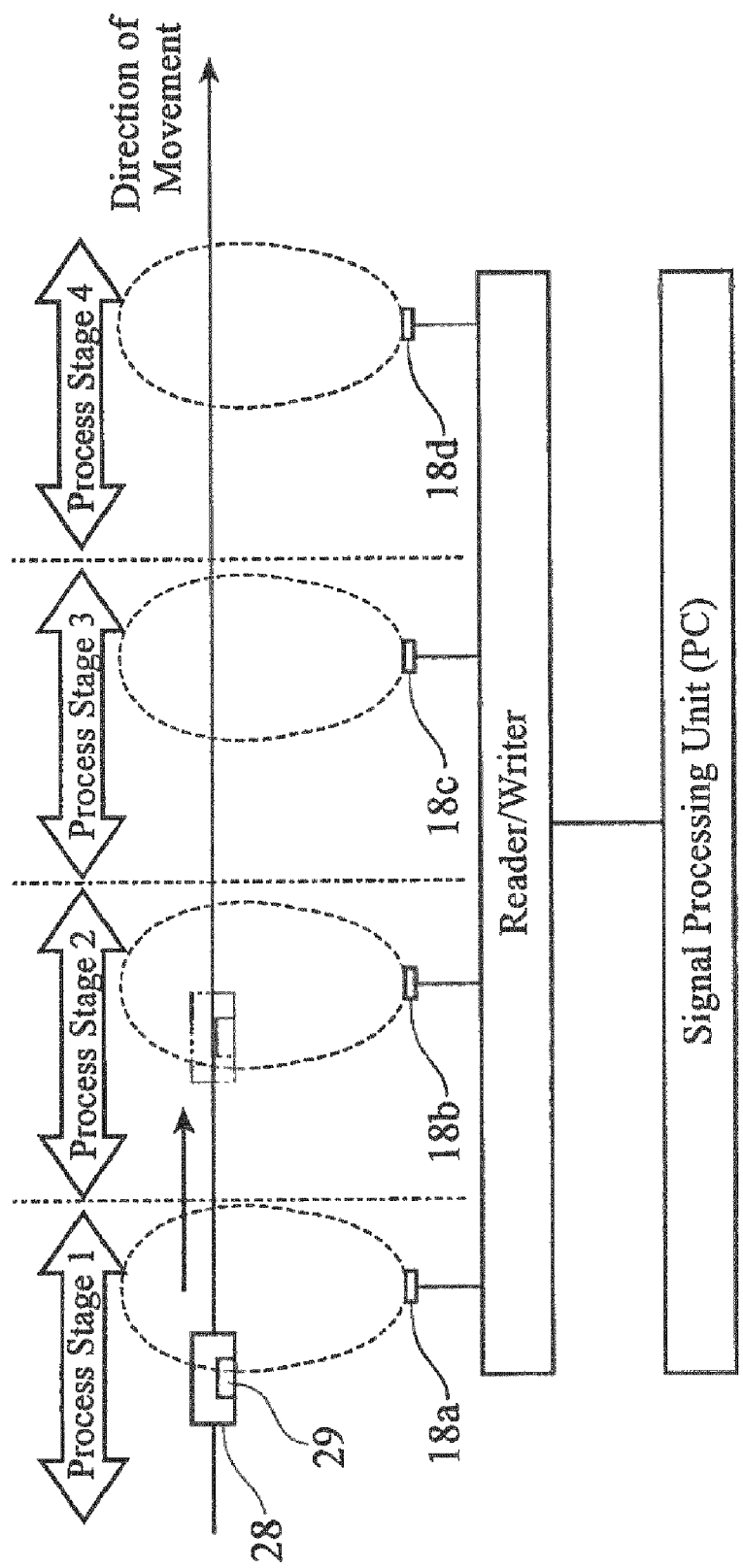
FIG. 10 is a configuration diagram of a history management system for managing a history of each product in manufacturing process stages using the RFID writer antenna in accordance with Embodiment of the present invention.

An example in which the RFID writer antenna in accordance with the invention of this Embodiment is applied to a history management system for managing a history of each product in manufacturing process stages in a line, such as FA, will be shown with reference to FIGS. 9 and 10. For the sake of simplicity, an explanation will be made by limiting the process stages to process stages 1 to 4. FIG. 9 is a configuration diagram of an RFID reader/writer device. In the figure, reference numeral denotes four reader/writer antennas connected to the reader/writer device via coaxial cables, and they are designated by 18*a* to 18*d* respectively. Reference numeral 19 denotes a time sharing control switch for sequentially switching among the connections between the reader/writer antennas 17*a* to 17*d* and an RF unit. Although the time intervals at which the time sharing control switch switches among the connections can be changed according to how this Embodiment is applied to the system, because it is necessary to read ID information at least once within a time period during which each product passes through one process stage (a "process stage pass time period", i.e. a time period during which a product is existing in a process stage in question), the time sharing control switch has to switch among the connections in a time sufficiently shorter than the above-mentioned process stage pass time period. Reference numeral 20 denotes a transmitting unit for generating an RF transmission signal. This transmitting unit is comprised of a modulating unit for modulating a local oscillation signal from a local signal transmitter (abbreviated as a "local transmitter" from here on) using tag command data which is a baseband signal to output the modulated local oscillation signal, and a power amplifier for performing high-frequency power amplification on the modulated signal to output an RF transmission signal. This RF transmission signal is sent out to the reader/writer antennas 17*a* to 17*d* via a circulator and the time sharing control switch 19. Reference numeral 21 denotes a receiving unit for carrying out a receiving process of receiving an RF received signal. This receiving unit is comprised of a low noise amplifier for amplifying and outputting the RF received signal from the circulator, a demodulating unit 442 for demodulating the RF received signal by using the local oscillation signal to generate demodulated data which is a baseband signal, and a level detector for generating an RSSI (Received SignaH2 Strength Indicator) signal showing the intensity of the received signal.

Reference numeral 22 denotes a command data generating unit for generating a command signal showing a reading command to a tag, reference numeral 23 denotes a tag ID identifying unit for identifying read ID information about a tag, reference numeral 24 denotes a determining unit for determining the presence or absence of a tag in a selected process stage area, and reference numeral 25 denotes a switch control unit for controlling the switching by the time sharing control switch 42. A baseband unit is comprised of these components. Reference numeral 26 denotes a process parameter setting unit for sending out various process parameters for control of the operation of the reader/writer device. The process parameters include the direction of movement and the traveling speed of a conveyance system (a conveyor), and a reference value which is used as a threshold for determination of the receive level. Reference numeral 27 denotes a history management unit for receiving the ID information about a tag from the reader/writer device, and for managing a history of each product in manufacturing process stages. A signal processing unit is comprised of the parameter setting unit 26 and the history management unit 27. The signal processing unit can be implemented by a signal processing device for exclusive use, or can be implemented via signal processing software installed in a general-purpose PC. In the figures, the same reference numerals denote the same components or like components, and therefore the detailed explanation about them will be omitted hereafter.

FIG. 10 is a configuration diagram of the history management system for managing a history of each product in manufacturing process stages by using RFID writer antennas in accordance with Embodiment of the present invention. Reference numeral 28 denotes a product which is made to flow in turn through the plurality of process stages by a conveying machine, such as a conveyor belt, and is subjected to a predetermined production process (assembly, inspection or the like) in each of the process stages. Processes in the plurality of process stages are performed on the product 28 in the order of "process stage 1→process stage 2→process stage 3→process stage 4". Reference numeral 29 denotes an RFID tag attached to the product 28, and ID information for identifying the tag (a code assigned to each tag, like TAG1 or TAG2) is stored in an internal memory of the RFID tag. This ID (IDentification) information differs from one tag to another. When the tag is attached to the product, the product is brought into a one-to-one correspondence with the tag, the ID information of the tag becomes identification information of the product. The tag includes required electronic circuit elements built therein, such as an antenna element for transmitting and receiving an RF signal to and from the reader/writer, a memory for storing the tag information, and a transmission and reception circuit. Although the reader/writer device, the signal processing unit, the reader/writer antennas 17*a* to 17*d* are as shown in FIG. 9, the reader/writer antennas 17*a* to 17*d* have directional characteristics to transmit and receive an RF signal to and from the tag 29, and at least one reader/writer antenna 17 is placed in each process stage area. Each of the reader/writer antennas 17*a* to 17*d* is oriented toward a determined direction and is placed at a determined distance from the product conveying machine in such a way as to cover the corresponding process stage area. In FIG. 10, each of the reader/writer antennas is placed in the center of the corresponding process stage area in such a way as to face a direction vertical to the direction of the movement of the product. Each of the antennas exhibits peak directional characteristics in a front direction, and has nearly-symmetrical characteristics. In the figures, the same reference numerals denote the same components or like components, and therefore the detailed explanation about them will be omitted hereafter.

Next, the operation of the history management system for managing a history of each product in manufacturing process stages by using the RFID writer antennas in accordance with the invention of this Embodiment will be explained. In this history management system, it is assumed that the switching among the connections with the reader/writer antennas 17 is carried out at fixed time intervals in the following cyclic order: "process stage 1→process stage 2→process stage 3→process stage 4→process stage 1→process stage 2→ . . . ", like the flow of the processes performed on products. After the system starts, the signal processing unit performs an initial setting of the process parameters on the reader/writer device. After that, whether or not the system is shut down is monitored continuously. The reader/writer device performs an operation of selecting the reader/writer antenna 17*a* in the first process stage 1 first. The time sharing control switch 19 connects the RF unit to the reader/writer antenna 17a according to a control command from the switch control unit 25, and the reader/writer device performs a process of reading the ID information of a tag in the area of the selected process stage 1. A read signal generated by the tag command generating unit 22 is modulated and amplified by the transmitting unit 20, and becomes an RF signal, and this RF signal passes through the circulator and the time sharing control switch 19 and is radiated, as a read radio wave signal, toward the area of the process stage 1 from the reader/writer antenna 17a, so that the reader/writer device gets access to the tag 28. The reader/writer device performs this access during a fixed time period until it switches to the next antenna. The reader/writer device then switches among the reader/writer antennas 17 at the fixed time intervals in the cyclic order of "process stage 1→process stage 2→process stage 3→process stage 4→process stage 1→process stage 2→ . . . ".

Because the reader/writer antenna in accordance with this Embodiment can be thus applied to a history management system for managing a history of each product in manufacturing process stages by using conventional reader/writer antennas, the length of one side of the antenna face of the reader/writer antenna in accordance with this Embodiment is reduced to about half of that of a conventional reader/writer using, as a dielectric substrate, an air layer without using any dielectric material and the area of the antenna face is reduced to about one-quarter to one-third of that of the conventional reader/writer, a reader/writer antenna can be arranged even in a process stage having a narrow processing line interval, and a dense arrangement of reader/writer antennas can done and space for arrangement of processing machines using them and workers who perform machining using them can be provided. Therefore, the use of reader/writer antennas in accordance with this Embodiment makes it possible to certainly perform management of a history of each product in manufacturing process stages in each of all manufacturing process lines or a certain number of manufacturing process lines close to the total number. Furthermore, in this Embodiment and the drawings, the explanation of the reader/writer antenna in which the radiating element is a circular patch conductor and a single-point feeding method is used is made as an example from first to last, though the shape of the patch conductor can be a rectangle and a two-point feeding method can be adopted instead. In this case, it cannot be overemphasized that the invention of this embodiment can be implemented.

INDUSTRIAL APPLICABILITY

As mentioned above, the RFID reader/writer antenna in accordance with the present invention, associated with the structure of the aerial portion of an RFID reader/writer device which performs communications with an RFID tag, is suitable for use in an RFID system used for biometric access (entrance and exit) management in an access restricted area, such as a habitable room, a factory, or an event site, management of products (physical-distribution management) in a factory or a work site, and so on.

The invention claimed is:

1. A patch antenna comprising:
a dielectric substrate having a circular or rectangular patch conductor disposed on a front surface thereof and a ground conductor disposed on a rear face thereof, a penetrating hole penetrating said dielectric substrate, and a coaxial track having a central conductor inserted into said penetrating hole, and electrically connected to a feeding point on said patch conductor and electrically insulated from said ground conductor, and an outer conductor covering an outer surface portion of said central conductor extending up to the rear face of said dielectric substrate, and electrically connected to said ground conductor,
wherein said patch antenna further includes:
a plurality of connection auxiliary means electrically connected to an end portion of said central conductor on a side of said patch conductor and radiately extending toward an edge portion of said penetrating hole on a side of said patch conductor; and
a connecting means for electrically connecting said plurality of connection auxiliary means and said edge portion, wherein said plurality of connection auxiliary means is a gear-shaped conductor.

2. A patch antenna comprising:
a dielectric substrate having a circular or rectangular patch conductor disposed on a front surface thereof and a ground conductor disposed on a rear face thereof, a penetrating hole penetrating said dielectric substrate, and a coaxial track having a central conductor inserted into said penetrating hole, and electrically connected to a feeding point on said patch conductor and electrically insulated from said ground conductor, and an outer conductor covering an outer surface portion of said central conductor extending up to the rear face of said dielectric substrate, and electrically connected to said ground conductor,
wherein said patch antenna further includes:
a connection auxiliary conductor having a central portion which surrounds a hole fitted to an end portion of said central conductor on a side of said patch conductor, and having a plurality of branch portions which are separated from each other and radiately extend from the central portion toward an edge portion of said penetrating hole on a side of said patch conductor;
a first connecting means for electrically connecting said central portion of said connection auxiliary conductor and said end portion of said central conductor on the side of said patch conductor; and
a second connecting means for electrically connecting said plurality of branch portions of said connection auxiliary conductor and said edge portion of said penetrating hole on the side of said patch conductor respectively.

3. The patch antenna according to claim 2, wherein said connection auxiliary conductor is shaped like a cross.

4. The patch antenna according to claim 2, wherein said connection auxiliary conductor is shaped like a star.

5. The patch antenna according to claim 2, wherein said connection auxiliary conductor is shaped like a gear.

6. The patch antenna according to claim 2, wherein said first connecting means is soldering between said central portion of said connection auxiliary conductor and said end portion of said central conductor on the side of said patch conductor.

7. The patch antenna according to claim 2, wherein said first connecting means is a contact fitting between said central portion of said connection auxiliary conductor and said end portion of said central conductor on the side of said patch conductor.

8. The patch antenna according to claim 2, wherein said second connecting means is soldering.

9. The patch antenna according to claim 2, wherein said connection auxiliary conductor is a conductive thin film.

10. The patch antenna according to claim 2, wherein said end portion of said central conductor on the side of said patch conductor has a projecting portion fitted to said hole in said central portion of said connection auxiliary conductor.

11. The patch antenna according to claim 2, wherein said end portion of said central conductor on the side of said patch conductor has a tapered portion shaped like a taper fitted to said hole in said central portion of said connection auxiliary conductor.

12. The patch antenna according to claim 2, wherein said patch conductor has a degeneration separation element formed like a notch.

* * * * *